United States Patent Office 2,727,924
Patented Dec. 20, 1955

2,727,924

PHENOLS FROM AROMATIC CARBOXYLIC ACIDS

Marshall B. Pearlman, Concord, Calif., assignor to The Dow Chemical Company, Midland, Mich., a corporation of Delaware No Drawing. Application January 8, 1954,
Serial No. 403,049

8 Claims. (Cl. 260—620)

This invention relates to a method for making phenolic compounds from certain aromatic carboxylic acids, and especially from dicarboxylic acids of the benzene and biphenyl series.

Specifically, it has been found that phenolic compounds may be made by a process of oxidation and decarboxylation from carboxylic acids having the general formula

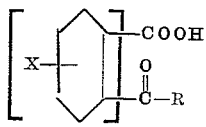

wherein X is a member of the group hydrogen and phenyl, R is one of the class hydroxyl, alkyl and phenyl, and in which any other nuclear substituents are inert to the oxidizing action of cupric ions and at least one unsubstituted position exists on the ring adjacent to the point of attachment of one of the carboxyl groups. Examples of acids susceptible to the process of this invention are phthalic acid, isophthalic acid, terephthalic acid, o-benzoylbenzoic acid, o-acetylbenzoic acid, diphenic acid, methoxy terephthalic acid, 4-bromophthalic acid, o-benzoyl-p-nitrobenzoic acid, 4,4'-dimethyl-2,2'-dicarboxy-biphenyl, o-acetyl-p-chlorobenzoic acid, and others conforming to the foregoing general formula.

The method whereby phenolic compounds may be made in significant yields from the described acids consists essentially in heating the acids with a cupric compound at a temperature above 200° C. at which carbon dioxide is liberated, in the presence of water and preferably in the presence of gaseous oxygen. The reaction may be effected under superatmospheric pressure, as in a closed vessel, but it may also be carried out at atmospheric or subatmospheric pressure. Thus, the acid may be brought in liquid or vaporous condition into contact with a bed of cupric compound at a temperature from 200° to 500° C., and the phenolic compound may be removed from the copper body by steaming, by blowing with an inert gas such as nitrogen, or by extraction with an inert solvent. The presence of water vapors in the reaction zone reduces the amount of undesirable by-product and tar formation, and the continuous or intermittent supply of air or oxygen maintains or restores the cupric condition in the copper body which serves as the catalyst or oxygen carrier.

The cupric compound employed may be cupric oxide, the cupric salt of a strong mineral acid, such as cupric sulfate or cupric chloride, or a cupric salt of an organic acid, particularly that of the acid to be converted to a phenolic compound. It is most conveniently and economically supplied initially as cupric sulfate or other salt which is soluble in water.

Tests have shown cupric compounds to be unique in their effect on the conversion of aromatic carboxylic acids to phenols, since the salts of aluminum, cadmium, cobalt, chromium, iron, lead, manganese, mercury, potassium, silver, tin and zinc produce no such effect and nickel and uranium salts effect only a very slight and commercially impractical conversion of the acids to phenols. It has also been found that the effect of the cupric compound is augmented by the presence of a salt or oxide of lithium, sodium, potassium, magnesium, barium or cobalt, but that these agents have no effect unless the cupric compound is present.

As will be noted in the following examples, the phenolic hydroxyl group appears in a position on the ring adjacent to that occupied by the carboxyl group, so it is believed necessary that there be an unsubstituted position adjacent to the point of attachment of the carboxyl in the acid being treated.

In the following examples, the identified acid was heated in a sealed vessel to 240° C. for 2 hours in contact with about 1 mol of cupric sulfate per mol of the acid, and 2 mols of water. The vessel was opened and the contents were removed and analyzed, and the products identified.

Examples

| Acid | Phenolic product(s) |
|---|---|
| 1. Phthalic | Phenol and m-hydroxybenzoic acid. |
| 2. Isophthalic | Phenol. |
| 3. Terephthalic | Phenol and m-hydroxybenzoic acid. |
| 4. Diphenic | m-Phenylphenol and 2-carboxy-3'-hydroxy-biphenyl. |
| 5. o-Benzoylbenzoic | m-hydroxybenzophenone and phenol. |
| 6. 4-Bromophthalic | 3-hydroxy-5-bromobenzoic acid, m-hydroxybenzoic acid. |
| 7. o-Benzoyl-p-nitrobenzoic | 3-hydroxy-5-nitrobenzophenone. |
| 8. o-Acetyl-p-chlorobenzoic | 3-hydroxy-5-chloroacetophenone. |

To illustrate the application of the reaction to an operation at atmospheric pressure, phthalic acid is melted in a reaction vessel fitted with a stirrer, and cupric phthalate is dissolved therein in amount of about 0.05 mol per mol of phthalic acid. The mixture is heated to 240° C. and a stream of steam mixed with air is bubbled slowly through the mixture. When the amount of carbon dioxide liberated from the reaction is about one mol for each mol of phthalic acid originally present, the organic material remaining in the reaction vessel and that which has been condensed from the effluent gas stream is found to consist of unchanged phthalic acid, phenol, benzoic acid and meta-hydroxybenzoic acid, with the last named being the principal phenolic product.

Many variations in procedure are possible, as it has been found that the defined carboxylic acids are converted to significant amounts of phenolic compounds whenever they are heated in contact with a cupric compound to a temperature at which carbon dioxide is liberated.

I claim:

1. The method which comprises heating in contact with a cupric compound and water, to a temperature above 200° C. at which carbon dioxide is liberated but below the temperature of destructive carbonization, a carboxylic acid having at least one unsubstituted position adjacent to the point of attachment of a carboxyl and having the general formula

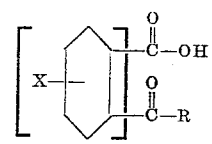

wherein X is a member of the group consisting of hydrogen and phenyl, and R is one of the class consisting of hydroxyl, alkyl and phenyl, any other nuclear substituents in said acid being inert to the oxidizing action of cupric compounds; at least part of the reaction being carried out in contact with gaseous oxygen; thereby to produce at least one phenolic compound.

2. The method claimed in claim 1, wherein the acid subjected to treatment is a benzene dicarboxylic acid.

3. The method claimed in claim 1, wherein the acid subjected to treatment is phthalic acid.

4. The method claimed in claim 1, wherein the acid subjected to treatment is a biphenyl dicarboxylic acid.

5. The method claimed in claim 1, wherein the acid subjected to treatment is diphenic acid.

6. The method claimed in claim 1, wherein the acid subjected to treatment is an acyl benzoic acid.

7. The method claimed in claim 1, wherein the acid subjected to treatment is an aroyl benzoic acid.

8. The method claimed in claim 1, wherein the acid subjected to treatment is a benzoyl benzoic acid.

References Cited in the file of this patent

UNITED STATES PATENTS

| | | |
|---|---|---|
| 1,712,753 | Daudt | May 14, 1929 |
| 1,714,956 | Jaeger | May 28, 1929 |
| 2,488,472 | Kremers | Nov. 15, 1949 |